United States Patent
Houts

(10) Patent No.: US 7,318,563 B2
(45) Date of Patent: Jan. 15, 2008

(54) CABLE LOCK ALARM SPOOL

(76) Inventor: Perry Houts, 3531 Skye Rd., Washougal, WA (US) 98671

( * ) Notice: Subject to any disclaimer, the term of this patent is extended or adjusted under 35 U.S.C. 154(b) by 414 days.

(21) Appl. No.: 11/100,962

(22) Filed: Apr. 6, 2005

(65) Prior Publication Data

US 2006/0226963 A1    Oct. 12, 2006

(51) Int. Cl.
 *B65H 75/08*    (2006.01)
 *E05B 37/00*    (2006.01)
 *E05B 67/06*    (2006.01)

(52) U.S. Cl. .......................... 242/613; 242/587; 70/30; 70/49; 70/233

(58) Field of Classification Search .............. 242/613, 242/613.1, 613.2, 587, 587.1, 587.2, 587.3, 242/172; 70/30, 49, 18, 14, 233, 225, 226, 70/227; 211/4, 5, 17–24, 85.5, 85.7
See application file for complete search history.

(56) References Cited

U.S. PATENT DOCUMENTS

| | | | |
|---|---|---|---|
| 1,545,660 A * | 7/1925 | Johnson ....................... | 70/260 |
| 1,545,902 A * | 7/1925 | Johnson ....................... | 70/49 |
| 3,824,540 A | 7/1974 | Smith, II | |
| 3,906,758 A | 9/1975 | Hurwitt | |
| 3,987,653 A * | 10/1976 | Lyon et al. ..................... | 70/19 |
| 4,098,099 A | 7/1978 | Smith | |
| 4,112,720 A * | 9/1978 | Green .......................... | 70/233 |
| 4,543,806 A | 10/1985 | Papandrea | |
| 4,665,724 A | 5/1987 | Sakai | |
| 4,776,188 A | 10/1988 | Dalaba | |
| 4,896,517 A | 1/1990 | Ling | |
| 5,023,596 A | 6/1991 | Sirman | |
| 5,156,028 A | 10/1992 | Jiang | |
| 5,251,464 A * | 10/1993 | Halter .......................... | 70/30 |
| 5,598,727 A | 2/1997 | White | |
| 5,786,759 A | 7/1998 | Ling | |
| 5,832,752 A | 11/1998 | Zeller | |
| 6,058,744 A | 5/2000 | Ling | |
| 6,192,719 B1 | 2/2001 | Stukas | |
| 6,681,603 B1 | 1/2004 | Yu | |

* cited by examiner

*Primary Examiner*—William A Rivera
(74) *Attorney, Agent, or Firm*—Rylander & Associates PC; Kurt M. Rylander

(57) ABSTRACT

A cable lock alarm spool which attaches to a cable lock alarm to increase the cable storage capacity includes an ovular track, parallel containing walls connected to and surrounding said ovular track, distally positioned lock access channels through said track, and a cable access channel through said track. Cable lock alarm spool can also include a plurality of cable storage slots, located on the outer circumference of said parallel containing walls.

5 Claims, 2 Drawing Sheets

CABLE LOCK ALARM SPOOL

FIELD OF THE INVENTION

The present invention relates to an improved apparatus for stowing the cable of a cable lock alarm. More particularly, the present invention relates to a cable spool that can be attached to an existing cable lock alarm to provide convenient stowage for cables longer than approximately fifteen feet.

BACKGROUND

A cable lock alarm allows for protection of one's property. Cable lock alarms such as the cable lock alarm A shown at FIG. 3 have a lock body unit, from which extends a length of metal cable. When a cable lock alarm is locked and activated, cutting the metal cable, or tampering with the lock body results in a high decibel alarm. The alarm feature of a cable lock alarm renders it superior to many conventional cable lock devices.

Cable lock alarms are currently manufactured having cable lengths of 8 feet, 15 feet, 30 feet, and 60 feet. For lengths of 8 feet and 15 feet, the cable wraps around the lock body, and is held in place by an attached clip. With cable lengths of 30 feet and 60 feet, there is no convenient method of storing the excess cable. The current invention addresses that problem.

Cable alarm locks are known in the art. However, the usefulness of currently available cable alarm locks is limited by the limited storage capacity provided for the cable. This limited storage capacity reduces the convenience of cable locks with longer cables needed to protect large items that are nonetheless portable, or multiple items, with a single cable alarm lock.

Most devices in the prior art store the cable within a housing of fixed size which severely limits the length of cable that may be accommodated—often to a length that can protect only a single bicycle or similar sized object. No means are provided to store a cable longer than the original design, or for extension cables that might be added after manufacture. Accommodating longer cables would entail expensive redesign of the entire lock housing.

Some prior art devices do provide external cable stowage, but the maximum cable length that may be conveniently stowed is again limited by the dimensions of the housing, which determine the maximum depth of the cable stowage slots. Typically a maximum of approximately 8-15 feet of cable length may be stowed. In either case described—devices with internal cable stowage or external stowage—manufacturers do not have the ability to easily and inexpensively expand the cable stowage capacity of the device. Additionally, users may wish to add extension cables to a cable alarm lock to protect large items or multiple smaller items.

As an example, the cable lock alarm shown at FIG. 3 shows a cable alarm lock with external cable stowage built into the alarm/lock housing. The built-in stowage capacity cannot accommodate cables with length greater than approximately 15 feet. In order to conveniently stow these longer cables, such as cable lengths of 30 feet or 60 feet the manufacturer would have to design, manufacture, and distribute units with different sized housings, depending on the cable length. Producing multiple versions of the same product in different sizes would necessarily increase overall production and distribution costs. Alternatively, the manufacturer might produce a single size housing, but large enough to accommodate the longest cable length. This would result in a product that was unnecessarily large and expensive for users who need only the smaller cable lengths to secure a single bicycle or similar item. Either alternative is unattractive.

As another example, a user may purchase a cable alarm lock to protect the single bicycle (or similar item) they currently own, but later wish to expand the cable lock capacity to accommodate several bicycles, perhaps owned by their family members. The user might therefore add a cable extender provided by the manufacturer to the original cable. But, without convenient means to stow the extra cable length the cable alarm lock would become difficult to store and transport, thereby reducing its usefulness. The user would thus be forced to bear the expense of purchasing several cable alarm locks or to forgo much of the usefulness of the device derived from convenient stowage of the cable. Numerous other examples could be shown to demonstrate the disadvantages of cable alarm locks with cable stowage capacity limited by the dimensions of the manufactured device housing.

A number of devices have provided cable locks with anti-tamper alarms, but lack the ability to conveniently stow long cables. Presently known art is unable to address this problem without expensive redesign of manufactured products. The following represents a list of known related art:

| Reference: | Issued to: | Date of Issue: |
| --- | --- | --- |
| U.S. Pat. No. 6,681,603 | Yu | Jan. 27, 2004 |
| U.S. Pat. No. 6,192,719 | Stukas | Feb. 27, 2001 |
| U.S. Pat. No. 6,058,744 | Ling | May 9, 2000 |
| U.S. Pat. No. 5,832,752 | Zeller | Nov. 10, 1998 |
| U.S. Pat. No. 5,786,759 | Ling | Jul. 28, 1998 |
| U.S. Pat. No. 5,598,727 | White | Feb. 4, 1997 |
| U.S. Pat. No. 5,156,028 | Jiang | Oct. 20, 1992 |
| U.S. Pat. No. 5,023,596 | Sirman | Jun. 11, 1991 |
| U.S. Pat. No. 4,896,517 | Ling | Jan. 30, 1990 |
| U.S. Pat. No. 4,776,188 | Dalaba | Oct. 11, 1988 |
| U.S. Pat. No. 4,665,724 | Sakai | May 19, 1987 |
| U.S. Pat. No. 4,543,806 | Papandrea | Oct. 1, 1985 |
| U.S. Pat. No. 4,098,099 | Smith | Jul. 4, 1978 |
| U.S. Pat. No. 3,906,758 | Hurwitt | Sep. 23, 1975 |
| U.S. Pat. No. 3,824,540 | Smith, II | Jul. 16, 1974 |

The teachings of each of the above-listed citations (which does not itself incorporate essential material by reference) are herein incorporated by reference. None of the above inventions and patents, taken either singularly or in combination, is seen to describe the instant invention as claimed.

Several of the above-listed citations teach the use of a locking device utilizing a cable where the cable retracts into and is stowed within the lock housing, using both automatic and manual methods for reeling the cable into and out of the housing. Examples are U.S. Pat. No. 6,681,603 to Yu, U.S. Pat. No. 6,192,719 to Stukas, U.S. Pat. Nos. 5,786,759 and 4,896,517 to Ling, and U.S. Pat. No. 4,098,099 to Smith. Some of these references also teach the use of anti-tamper alarms combined with a cable lock. Examples are U.S. Pat. Nos. 5,786,759 and 4,896,517 to Ling, U.S. Pat. No. 5,023, 596 to Sirman, U.S. Pat. No. 4,776,188 to Dalaba, and U.S. Pat. No. 3,824,540 to Smith. In the existing art, the maximum cable length which can be conveniently stowed is limited by the physical dimensions of the housing containing the lock and alarm mechanisms.

Thus, the foregoing body of art shows it is well known to have a lock using a cable combined with anti-tamper alarms. However, the art described above does not teach or suggest a device for increasing the stowage capacity of cable alarm locks by adding an external cable reel to accommodate longer lengths of cable, such as cables greater than approximately 15 feet in length. Nor do prior art devices provide for the ability to add additional cable length after manufacture or replace the original cable with a longer cable, since their internal and external stowage arrangements cannot accommodate the added cable length.

SUMMARY AND ADVANTAGES

A cable lock alarm spool of the present invention attaches to a cable lock alarm to increase the cable storage capacity on an existing cable lock alarm, and includes an ovular track, parallel containing walls connected to and surrounding said ovular track:, distally positioned lock access channels through said track, a cable access channel through said track, and a plurality of cable storage slots, located on the outer circumference of said parallel containing walls.

The cable lock alarm spool of the present invention presents numerous advantages, including: (1) relatively inexpensive to manufacture; (2) easy to use; (3) can be used with and attached to off the shelf cable lock alarms; (4) externally mounted; (5) increases stowage of greater cable lengths, such as lengths greater than 15 feet, and up to 30 feet and 60 feet; (6) improves flexibility and usefulness of cable lock alarms to manufacturers and end users; (7) improves transportability of cable lock alarms with extended length cables; (8) increases dimensions of housing of cable lock alarm beyond that set in the manufacturing process; (9) allows for an inexpensive means of providing different length cable storage on the same cable lock alarm housing; (10) provides a means for increasing the length of cable that may be stored conveniently on a cable alarm lock housing by adding an external cable spool, with cable slots and facing walls sized to accommodate cables of lengths greater than provided in the normal stowage capacity of the cable alarm locking device.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
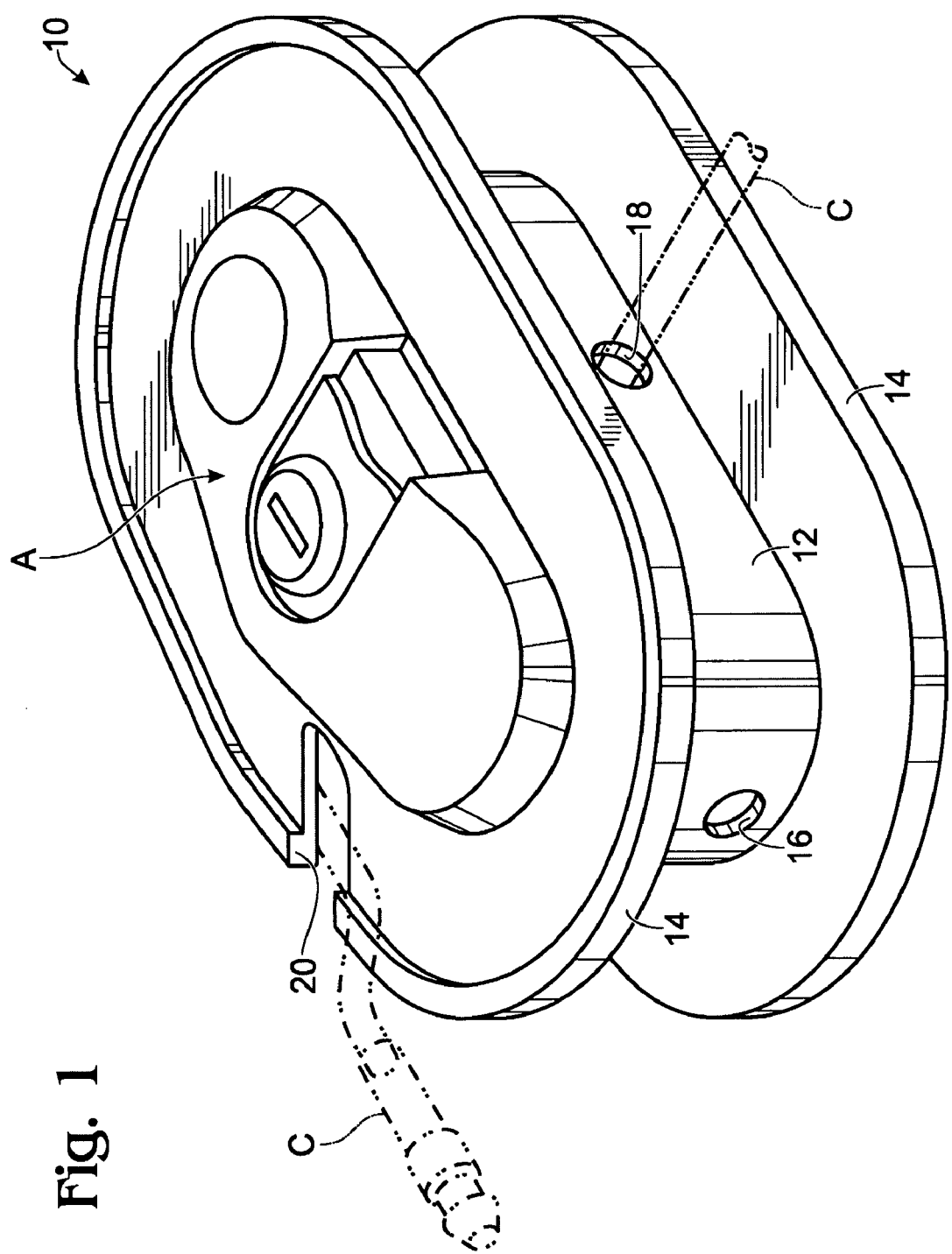
FIG. 1 shows an embodiment of the present invention 10 in use attached to a cable lock alarm A.
Figure 2:
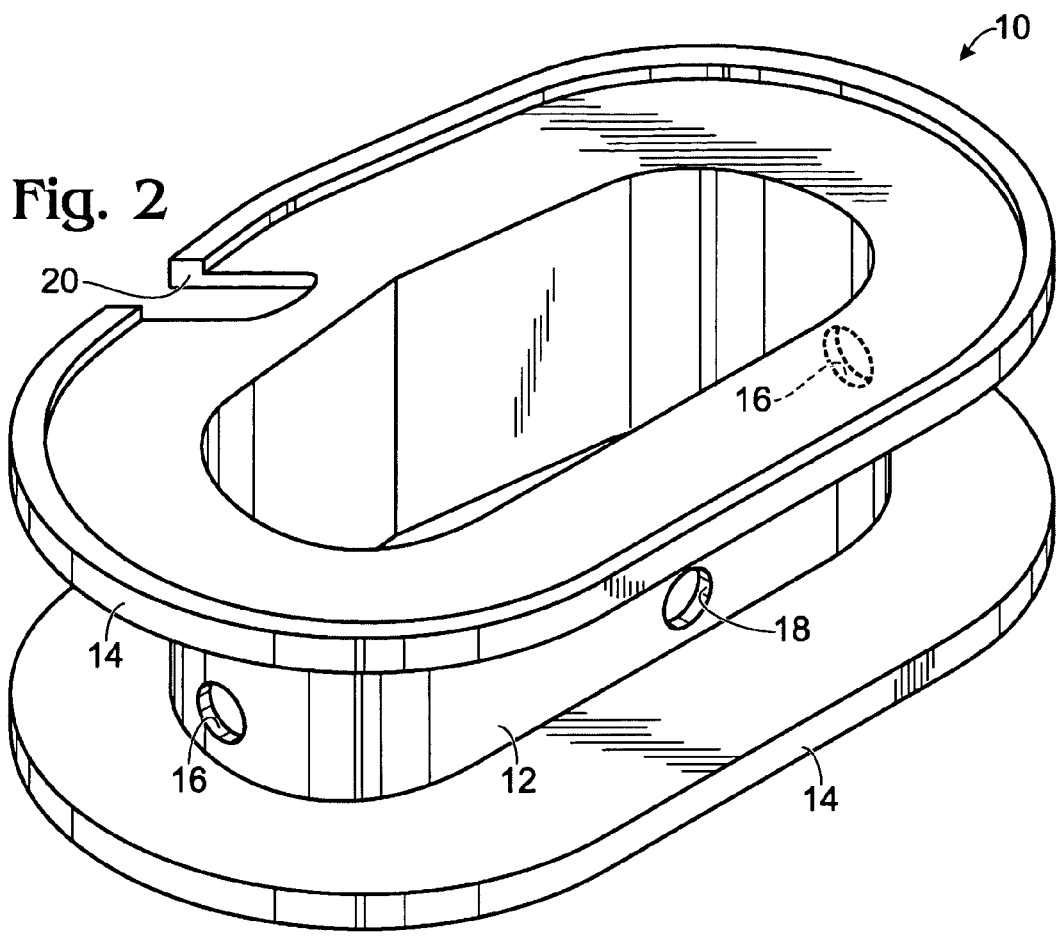
FIG. 2 shows an embodiment of the present invention.
Figure 3:
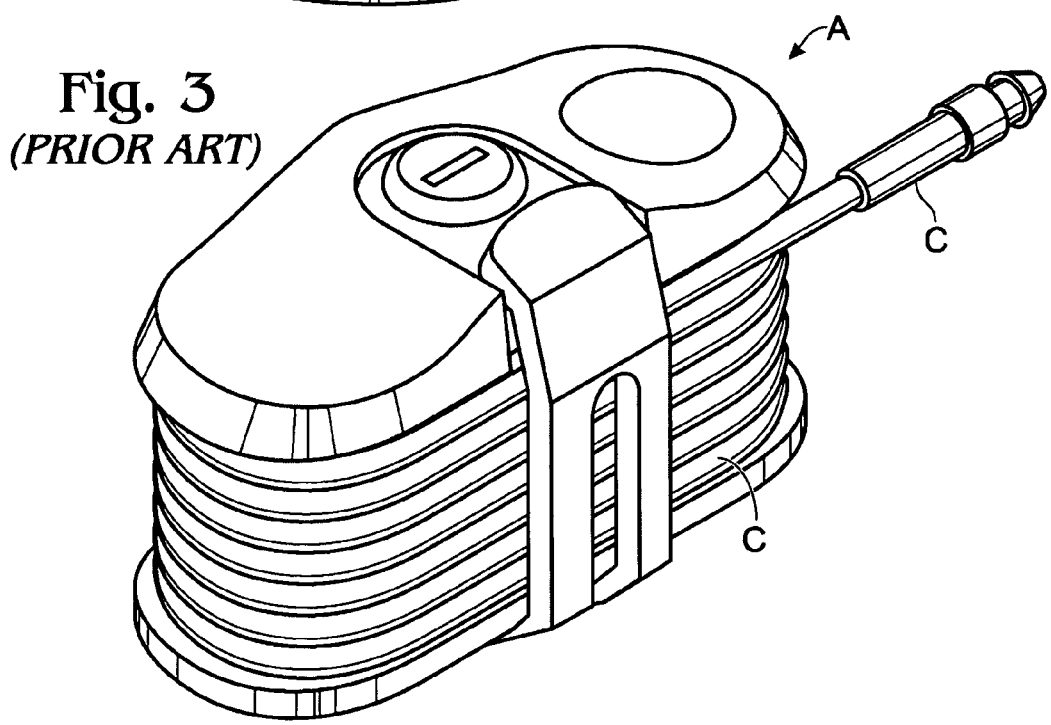
FIG. 3 shows an existing cable lock alarm A to which an embodiment of the present invention can be attached.

A cable lock alarm spool which attaches to a cable lock alarm to increase the cable storage capacity on an existing cable lock alarm A. As shown in FIGS. 1-2, cable lock alarm spool 10 includes an ovular track 12, parallel containing walls 14 attached to and separated by said track and surrounding said ovular track, distally positioned lock access channels 16 through said track, and a cable access channel 18 through said track.

As shown in FIGS. 1-2, ovular track 12 possesses a diameter slightly larger than that of the cable lock alarm A. Track 12 is substantially flat, providing a surface upon which cable C can lay in rows when wound on the spool 10.

Parallel containing walls 14 contain the cable C as it is wound around the ovular track 12 preventing the cable C from winding off of the track 12. As shown in FIGS. 1-2, parallel containing walls 14 preferably extend orthogonally from each side of the flat portion of the ovular track 12 to form a spool. Parallel containing walls 14 may extend at an obtuse angle, spreading out from the width of the track 12 as the walls 14 extend upward, allowing for greater cable storage capacity.

As shown in FIGS. 1-2, lock access holes 16 are distally located on opposite sides of ovular track 12. As shown in FIGS. 1-2, cable access hole 18 is located on the long face of ovular track 12, such that it corresponds to the cable exit point on the cable lock alarm A. Lock access holes 16 and cable access hole 18 are extend completely through ovular track 12.

Preferably, cable lock alarm spool 10 is made of plastic material. However, cable lock alarm spool 10 may be constructed from glass filled polycarbonate, steel, aluminum, ABS material, or another equally resilient material.

As shown in FIGS. 1-2, a cable lock alarm spool 10 can further be provided with a plurality of cable storage slots 20 along the outer circumference of the parallel containing walls 14, through which the cable C can be slotted and held in place. Cable storage slots 20 are located along the outer circumference of parallel containing walls 14. The diameter of each cable storage slot 20 slightly exceeds the diameter of the cable C of the cable alarm lock A.

In operation, cable lock alarm spool 10 attaches to central body of cable lock alarm A, as shown in FIG. 1. Cable lock alarm A inserts through interior of oval track 12 of cable lock alarm spool 10. Cable C from the cable lock alarm A then feeds through cable access hole 18, wrapping around ovular track 12. Parallel containing walls 14 prevent the cable C from slipping off of ovular track 12. When cable storage slots are provided, cable C fits through any of the cable storage slots, securing the cable C.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A cable lock alarm spool, comprising:
   an ovular track attachable to and round a cable lock alarm;
   parallel containing walls attached to and separated by said track and surrounding said ovular track;
   distally positioned lock access channels through said track; and
   a cable access channel through said track for a cable from said cable lock alarm to fit through to be stored around and over said ovular track and between said parallel containing walls.

2. The cable lock alarm spool of claim 1, further comprising a plurality of cable storage slots located on said parallel containing walls.

3. The cable lock alarm spool of claim 1 or 2, sized to accommodate cables of lengths up to 60 feet.

4. The cable lock alarm spool of claims 1 or 2, wherein said spool is made of plastic, glass filled polycarbonate, steel, aluminum, ABS material, or another equally resilient material.

5. The cable lock alarm spool of claim 1, further comprising
   means for securing cable wound on said track between said containing walls, wherein said securing means contains a first end flexibly coupled to a first of said parallel containing walls and a second end with a fastening means, such that said second end of said securing means engages to the second of said parallel containing walls with said fastening means to prevent the cable from said cable lock alarm from unwinding from said cable lock alarm spool.

* * * * *